UNITED STATES PATENT OFFICE.

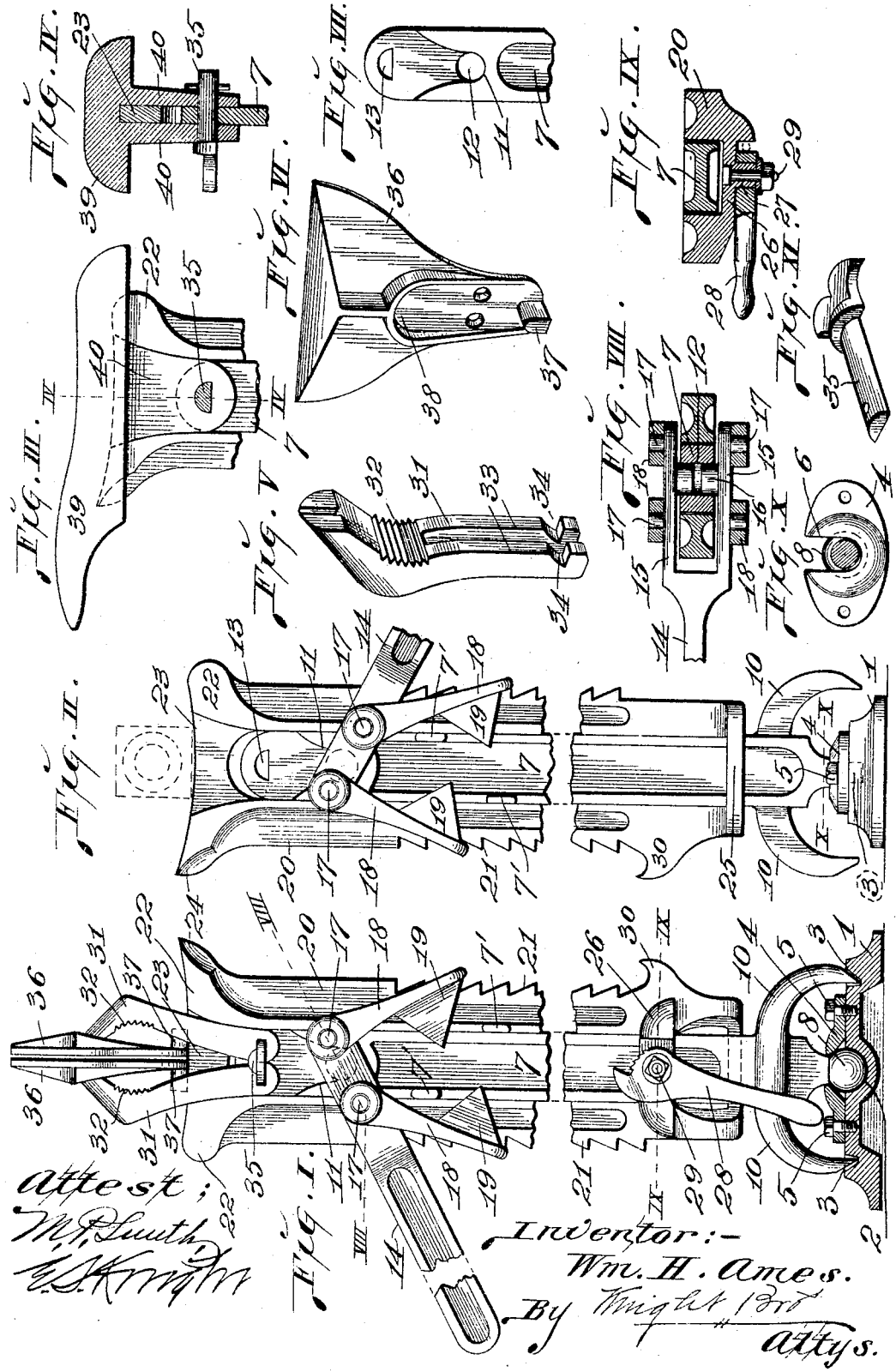

WILLIAM H. AMES, OF ST. LOUIS, MISSOURI.

COMBINED IMPLEMENT.

No. 805,334. Specification of Letters Patent. Patented Nov. 21, 1905.

Application filed April 17, 1905. Serial No. 256,162.

*To all whom it may concern:*

Be it known that I, WILLIAM H. AMES, a citizen of the United States, residing in the city of St. Louis, in the State of Missouri, have invented certain new and useful Improvements in Combined Implements, of which the following is a full, clear, and exact description, reference being had to the accompanying drawings, forming part of this specification.

My invention relates to an implement having various utilities and including therein a hoisting-jack, a vise, a wire-stretcher, and a shoe-last stand.

Figure I is a side elevation of my implement with the parts applied thereto when the implement is used as a vise. Fig. II is a side view of the implement looking at the side opposite that seen in Fig. I and showing the implement in condition for use as a hoisting-jack. Fig. III is a view of the upper end of the implement with the shoe-last applied thereto. Fig. IV is a vertical section taken on line IV IV, Fig. III. Fig. V is a perspective view of one of the pipe-gripping jaws of the implement. Fig. VI is a perspective view of one of the flat-faced vise-jaws. Fig. VII is a side view of the upper end of the implement-post. Fig. VIII is a cross-section taken on line VIII VIII, Fig. I. Fig. IX is a cross-section taken on line IX IX, Fig. I. Fig. X is a top view of the base-cap of the implement and the ball end of the post fitting therein, the post being shown in cross-section. Fig. XI is a perspective view of the pin by which the pipe vise-jaws and the shoe-last are connected to the post of the implement.

1 designates the base of my implement, which is supplied with a central socket 2 and has in its upper side near its ends pockets 3. This base is oblong in shape, as will be seen by referring to Figs. I and II, so that it has greater length than breadth. 4 is a cap secured to the top side of the base 1 by screws 5, and extending longitudinally of said base. The cap is provided with a notch 6, extending inwardly from one of its sides.

7 designates the post of the implement, which is provided at its lower end with a ball 8, that seats in the socket 2 of the base, to which it is adapted to be confined by the cap 4.

10 represents arms integral with the post 7 and extending laterally from its edges near its lower end and downwardly, these arms being arranged to be seated in the pockets 3 of the base of the implement to hold the post 7 in upright position and prevent rotation thereof with respect to the base while the arms are so seated. It is desirable to so hold the post when the implement is being used as a vise, as seen in Fig. I.

In the post 7, near its upper end and at each side thereof, is a socket 11, (see Figs. I, II, and VII,) and extending through the post at the location of the sockets is an aperture 12. In the upper end of the post is a non-circular opening 13.

14 designates a hand-lever having a pair of fork-arms 15, that are adapted to straddle the post 7 and each of which is provided with a fulcrum-stud 16, that is adapted to rest in one of the sockets 11 of the post 7, as seen in Fig. VIII and dotted lines, Figs. I and II, and enter into the aperture 12. These studs form the bearings upon which the hand-lever operates when it is raised and lowered. Extending from the outer sides of the lever fork-arms 15 are pivot-studs 17.

18 represents ratchet-loops loosely fitted to the pivot-studs 17 and hanging suspended therefrom at opposite sides of the points of location of the fulcrum-studs 16, so that leverage action is secured with respect to both of said loops when the hand-lever is oscillated. Each of the ratchet-loops is provided with a trip-arm 19, that is adapted to impinge against corresponding trip-lugs 7', projecting from one or both sides of the post 7 when the hand-lever is moved more than a certain distance, whereby the ratchet-loops are thrown outwardly to disengage them from the ratchet-frame to be presently mentioned.

20 designates a ratchet-frame which is slidably fitted to the post 7 and which has two side portions provided at their edges with ratchet-teeth 21 to receive the ratchet-loops 18, the said side portions inclosing the implement-post to ride in contact therewith. The movement of the vise-jaws toward each other, as stated, is obtained through the medium of the ribs 22 upon the sides of the ratchet-frame bearing against the rear edges of the vise-jaws when the ratchet-frame is raised relative to the post 7. The upper end of the ratchet-frame is formed with a central web 23 and ribs 22, located at its side, and it is provided at one edge with a prong 24. The side portions of the ratchet-frame are united at their lower ends by a cross portion 25, (see Fig. II,) and at the opposite side of the frame the side portions are connected by a recessed cross portion 26. This cross portion 26 has projecting outwardly therefrom a boss 27, on which is rockingly mounted a cam-lever 28 (see Figs. I and IX) and between which and a projecting part of the cross portion 26 a wire to be stretched is adapted to be gripped, as seen in dotted lines, Fig. IX. The cam-lever is held to the boss 27 by a bolt 29, passing through the portion 26 and its boss, thereby providing for the detachable connection of the cam-lever to the implement.

30 is a hook projecting from one of the side portions of the ratchet-frame 20, (see Figs. I and II,) this hook being designed for utility in receiving the engagement of wire-fabric fencing in the stretching of such fencing by the use of my implement.

31 designates a pair of pipe vise-jaws provided with serrations 32 at their inner sides and having bifurcated legs 33, that are adapted to straddle the ratchet-frame web 23 and the upper end of the post 7, as seen in Fig. I. Each of the vise-jaw legs is provided near its lower extremity with a transverse notch 34, (see Fig. V,) which is adapted to register with the non-circular opening 13 in the upper end of the post 7 when the vise-jaws are seated in the implement. The jaws are detachably held to the post 7 by a removable pin 35, having a non-circular shank (see Fig. XI) that fits in the opening 13 and serves to hold the jaws to the post 7 in a manner to permit their rocking motion.

36 designates a pair of flat-faced clamp-jaws that are adapted to be introduced between the pipe-jaws 31 and held thereby. Each of these clamp-jaws is provided at its lower end with an outwardly-extending stud 37, that fits between the legs of the adjacent pipe vise-jaws and whereby the corresponding clamp-jaw is detachably held while in service. At the outer faces of the clamp-jaws are sockets 38, (see Fig. VI,) that receive the free ends of the vise-jaws 31.

39 designates a shoe-last that is adapted to be applied to the head 22 of the ratchet-frame 20, so that it fits upon the upper end of said head. This last is provided with legs 40, extending downwardly therefrom to straddle the web 23 of the ratchet-frame head and the upper end of the post 7. When the last is so applied, the pin 35 is passed through the legs of the last and the opening 13 in the post 7 to detachably hold the last in position.

When my implement is to be used as a pipe-vise, the parts are disposed as seen in Fig. I, and the clamp-jaws 36 being omitted the hand-lever 14 may be actuated to raise the ratchet-frame 20 with respect to the post 7, due to the engagement of the ratchet-loops 18 with the ratchet-teeth 21. When the ratchet-frame is so elevated, the vise-jaws are carried inwardly toward each other to grip a pipe placed between them. When the implement is to be used with the clamp-jaws 36 in service, the said jaws are introduced between the vise-jaws while they are in separated condition and the ratchet-frame is in lowered position, and on raising the ratchet-frame by manipulation of the hand-lever the clamp-jaws are moved toward each other.

When the implement is to be used as a wagon-jack, the pipe-jaws and clamp-jaws are removed from the implement and the ratchet-frame is elevated with respect to the post 7 in the same manner before mentioned. When the implement is to be used as a wagon-jack, it is preferable to swing the post 7 from the position with respect to the base 1 as seen in Fig. I to that seen in Fig. II, and to permit of such swinging I remove one of the fastening-screws 5, that hold the cap 4, and swing said cap laterally, so that the ball or foot 8 of the post 7 may be removed from the base-socket 2 and the arms 10 lifted from the base-pockets 3. The ball 2 is then again seated in the base-socket, as before, with the post 7 and its arms 10 extending transversely of the base 1, so that said arms are free of bearing against said base. With the parts in this position the post 7 may be tilted with respect to the base 1 by moving in the notch in the cap 4. The tilting of the post and ratchet-frame permits of the proper seating of the base 1 irrespective of whether the foundation on which it rests is level or not. While the implement is in the condition just described it may be used to excellent advantage as a post-puller, in which use the prong 24, projecting from the head 22 of the ratchet-frame, is driven into the post, and the base of the implement resting upon the ground the post may be readily extracted by manipulating the hand-lever 14 to raise the ratchet-frame.

Where the implement is to be used as a wire-stretcher—as, for instance, in building fences—either the base of the implement or one of the arms 10, carried by the post, may be seated against a fence-post, and a wire having been clamped by the cam-lever 28 the ratchet-frame is shifted by actuating the hand-lever 14 to draw upon the wire.

I claim as my invention—

1. In a combined implement of the character described, the combination of a base provided with a socket and having a pair of pockets therein, a post having one of its ends seated in said socket, arms extending laterally from said post and adapted to enter the pockets in said base, a ratchet-frame slidably fitted to said post, and means for reciprocating said ratchet-frame, substantially as set forth.

2. In a combined implement of the character described, the combination of a base provided with a socket and having a pair of pockets in its upper side, a post having one of its ends seated in the socket in said base, a notched cap for confining the end of said post in said socket, a pair of arms extending laterally and downwardly from said post to enter the pockets in said base, a ratchet-frame slidably fitted to said post, and means for reciprocating said ratchet-frame with respect to said post, substantially as set forth.

3. In a combined implement of the character described, the combination of a post provided with sockets at its sides, a ratchet-frame slidably fitted to said post, a hand-lever having forked arms provided at their inner sides with fulcrum-studs fitting in the sockets of said post, and ratchet-loops pivoted to the fork-arms of said lever at opposite sides of said fulcrum-studs, substantially as set forth.

4. In a combined implement of the character described, the combination of a post provided with an opening extending therethrough, a ratchet-frame slidably fitted to said post, a pair of vise-jaws straddling the head of said frame and having notches in their lower ends adapted to register with the opening in said post, a pin for detachably connecting said vise-jaws to said post by passing through the notches in the jaws and the opening in the post, and means for reciprocating said ratchet-frame with respect to said post, substantially as set forth.

5. In a combined implement of the character described the combination of a post, a ratchet-frame slidably fitted to said post, a hand-lever rockingly fitted to said post, ratchet members carried by said hand-lever, and automatic means for tripping said ratchet members out of engagement with said ratchet-frame, substantially as set forth.

6. In a combined implement of the character described, the combination of a post, a ratchet-frame slidably fitted to said post, a hand-lever rockingly fitted to said post, ratchet-loops pivoted to said hand-lever and arranged for engagement with said ratchet-frame, trip-arms carried by said ratchet-loops, and trip-lugs projecting from said post and arranged to receive the engagement of said ratchet-loop trip-arms, substantially as set forth.

WILLIAM H. AMES.

In presence of—
B. G. STOCKFELD,
L. Y. COMPTON.